United States Patent [19]

Campbell

[11] 4,288,149
[45] Sep. 8, 1981

[54] RESIN OPHTHALMIC LENSES HAVING A PRISMATIC SEGMENT

[75] Inventor: Charles D. Campbell, La Jolla, Calif.

[73] Assignee: Signet Optical Corporation, San Diego, Calif.

[21] Appl. No.: 881,131

[22] Filed: Feb. 24, 1978

Related U.S. Application Data

[63] Continuation-in-part of Ser. No. 765,537, Feb. 4, 1977, abandoned, and Ser. No. 876,323, Feb. 9, 1978, Pat. No. 4,163,541, which is a continuation-in-part of Ser. No. 765,536, Feb. 4, 1977, abandoned.

[51] Int. Cl.³ .................................................. G02C 7/06
[52] U.S. Cl. .................................................... 351/170
[58] Field of Search ......................... 351/168, 170, 174

[56] References Cited

U.S. PATENT DOCUMENTS

| 815,648 | 3/1906 | Slagle | 351/170 |
|---|---|---|---|
| 2,006,640 | 7/1935 | Hubbell | 351/168 |
| 2,072,593 | 3/1937 | Hill | 88/54 |
| 2,254,440 | 9/1941 | Moulton | 351/170 |
| 2,796,000 | 6/1957 | Beasley | 88/54 |
| 2,890,486 | 6/1959 | Crandon | 18/39 |
| 3,297,422 | 1/1967 | Emerson et al. | 351/168 UX |
| 3,460,928 | 8/1969 | Casko | 65/39 |
| 3,614,217 | 10/1971 | Bronstein | 351/161 |
| 3,649,236 | 3/1972 | Rosenbauer | 351/168 UX |
| 3,946,982 | 3/1976 | Calkins et al. | 249/102 |

FOREIGN PATENT DOCUMENTS

131921  7/1960  U.S.S.R. .............................. 351/170

Primary Examiner—John K. Corbin
Assistant Examiner—Scott J. Sugarman
Attorney, Agent, or Firm—Christie, Parker & Hale

[57] ABSTRACT

A cast resin ophthalmic lens comprises a homogeneous body defined of cured optical casting resin. The body has a cast optically finished front surface composed of a major surface portion and a minor surface portion. The minor surface portion defines in the front surface, in a selected localized area thereof, a lens segment having a predetermined prismatic optical effect. The major surface portion is a portion of a surface of revolution having a first axis of symmetry and having an effective center of curvature therealong. The minor surface portion is a portion of a surface of revolution having a second axis of symmetry. The first and second axes of symmetry intersect, if at all, at a location on the first axis other than at substantially the center of curvature of the major surface portion.

4 Claims, 24 Drawing Figures

RESIN OPHTHALMIC LENSES HAVING A PRISMATIC SEGMENT

CROSS REFERENCE TO RELATED APPLICATIONS

This application is a continuation-in-part of now abandoned application Ser. No. 765,537 filed Feb. 4, 1977; it is also a continuation-in-part of application Ser. No. 876,323 filed Feb. 9, 1978, as a continuation-in-part of now abandoned application Ser. No. 765,536 filed Feb. 4, 1977. Application Ser. No. 876,323 is now U.S. Pat. No. 4,163,541.

FIELD OF THE INVENTION

This invention relates to resin ophthalmic lenses as distinguished from glass ophthalmic lenses. More particularly, it relates to a resin ophthalmic lens in which a segment of either prismatic optical effect or prism compensating optical effect is provided over a fractional portion of the front optical surface of the lens, the lens front surface having a principal curvature of either spherical or aspheric nature.

BACKGROUND OF THE INVENTION

Terminology and Introduction

As used herein, the term "blank" refers to a lens element at any stage in the manufacture of the lens up to and including its finishing to a specified optical prescription but prior to edging to fit a particular spectacle frame. A "major blank" is the basic element of a composite glass lens, the major portion of the surface of which defines the basic optical property of the lens such as the distance correction. A "minor blank" is a minor component of a composite glass lens which is combined with a major blank to produce a desired optical effect. The term "blank" also refers to a mold element for casting a resin lens at any stage in the manufacture of a mold useful to cast a surface of a semi-finished or finished resin lens.

A "segment" is a portion of a glass or resin lens (or of a resin lens mold) which has an optical curvature or other optical or optically related characteristic different from remaining or other portions of the lens (or mold), such as the portion of a bifocal lens which defines a reading prescription as opposed to a distance prescription. An "addition" is a localized portion of a glass or resin lens which has an optical curvature or other optical characteristic different from remaining or other portions of the lens; a "reading addition" usually refers to the close or reading prescription portion of a multifocal lens. The terms "segment" and "addition" are often used interchangeably in describing lenses.

A lens has "positive" or "plus" curvature when it is of convex overall curvature, and has "minus" or "negative" curvature when it is concavely curved overall.

A "diopter" is a measure of the light focusing properties of a lens; a lens has a power of 1 diopter when it focuses a ray of incident light from a source of infinite distance from the lens at a point 1 meter behind the lens; a 2 diopter lens focuses an incident infinite-source ray ½ meter behind the lens. "Prism diopter" is a measure of the prism or light deviating effect of a lens. One prism diopter corresponds to the deviation of an emergent ray by 1 centimeter from the lens axis at a distance of 1 meter from the lens; that portion of a 1 diopter lens which lies 10 millimeters from the lens' optical axis produces a prismatic effect of 1 prism diopter.

It will be understood that any optical lens is designed to produce a particular optical effect when mounted in a particular manner to act upon light incident on the lens in a particular way. Virtually every optical lens is designed with these usage conditions in mind, regardless of whether the lens is for a camera, a telescope or an automobile headlamp. This is especially the case with ophthalmic lenses which are designed to be worn in a specified position by a particular person suffering from a specified optical difficulty to produce for that person a desired optical effect. Therefore, especially in the case of ophthalmia to which this invention pertains, it is not very helpful to consider a lens in the abstract; it is more helpful and useful to consider the lens in the context of its intended use. Similarly, an appreciation of molds for casting resin ophthalmic lenses is aided by keeping in mind the lens produced from a given mold and the effect of that lens on a person when properly fitted to the person.

In the context of this invention, the "optical axis" of an ophthalmic lens is the line along which the user of the lens looks when the lens is properly fitted to the user and the user is looking straight ahead. The optical axis of a resin ophthalmic lens will usually have a counterpart in the mold from which the lens is cast.

General Background

Diplopia is double vision of a single object and is usually considered as a disorder of sight. Most commonly diplopia is due to imbalance between or lack of coordination of the muscles which determine the positioning of the eye for line of sight and of the muscles associated with the lens of the eye for distance focusing. Treatment of diplopia often involves the use of prismatic effects in ophthalmic lenses. Desirable prismatic effects in an ophthalmic lens can be used to train eye muscles to work together to cure or reduce the problems of diplopia. Undesired prismatic effects can induce diplopia.

As noted below, while the lens produced by the present invention may be used as a specific in the treatment of diplopia, it is believed that these lenses are of more significant utility in applications where the objective is to prevent induced diplopia in lenses defined for treatment of disorders other than diplopia. Specifically, a presently preferred utility of this invention, but certainly not the only utility, is in resin lenses of high positive spherical or aspherical curvature such as highly aspheric lenses of the type prescribed for aphakic patients. Aphakia is the absence of the crystalline lens in the human eye, and most commonly results from the removal of the natural lens from sufferers of cataracts.

The problem of undesired prismatic effects can be illustrated in the case of ophthalmic lenses for a bilateral aphakic patient, i.e, a patient who has had a cataract operation in each eye. Such lenses commonly are of highly positive dioptric power. Assume that both lenses are identical. When the user looks straight ahead, he looks down the optical axes of the lenses and no prismatic effects are encountered. If the user should look to either side, say to the left, without turning his head to align the lenses' optical axes with his lines of sight, then the lines of sight of his left and right eyes pass through highly prismatic portions of his corrective lenses, but no disturbing prismatic effects are sensed. This is so because the left eye is looking through a base-in prism and the right eye is looking through a similar base-out prism. The prismatic effects presented to the left and right eyes are equal in magnitude but opposite in sign, and thus cancel each other and present no significant prismatic imbalance.

(A base-in prism is defined as a prism or optical wedge which has its thick or base end located toward a patient's nose; a base-out prism has its base located away from the nose.)

An entirely different situation is encountered when the sight lines of the eyes of a bilateral aphakic patient converge, as when such a person looks at something close, as in reading. In such a instance, the left and right lines of sight each pass through portions of the corrective lenses which are equivalent to base-out prisms, and the effective prismatic effect on the patient is equal to the sum of the prismatic powers of the lenses. The result is a significant prismatic imbalance which, if encountered for any extended time, results in induced diplopia or double vision.

Because the corrective lenses prescribed for aphakic patients, whether suffering from monocular or binocular aphakia, inherently have high prismatic power when used off the optical axis, it is common for aphakics to read with monocular vision. This monocular vision results when, after a period of reading, the eye muscles can no longer accommodate the prismatic imbalance and diplopia is induced. The image from one eye is subconsciously suppressed in favor of the image from the dominant eye. Most persons normally tend to prefer one eye over the other. Thus, most people tend to suppress the image from the nondominant eye under all conditions of induced diplopia, although some alternate the image suppression equally between the eyes. Repeated suppression of the image from an eye in response to induced diplopia can cause atrophy in that eye and its muscles.

It is well known that the human brain and eye musculature can accommodate a base-in optical prismatic imbalance much more efectively than they can accommodate an equal amount of base-out prismatic imbalance.

Thus, for the benefit of aphakic patients as well as persons suffering from other vision disorders, a need exists for ophthalmic lenses which inherently correct for prismatic imbalance.

The Prior Art—Glass Lenses

The problem of prismatic imbalance in glass ophthalmic lenses has been solved by using, in a single lens, glasses having different indices of refraction. In a prism-compensated glass lens the major lens blank is defined of a glass having one index of refraction to which is fused, prior to finish grinding of the blank and usually in the area of the blank which will define the reading area of the finished lens, a minor blank (segment) of a glass having a different index of refraction. The segment may be placed in a recess formed in the front surface of the major blank. After the major blank and segment have been fused or otherwise adhered together, the blank is ground and polished to the desired frontal spherical or aspherical curvature to define the optically finished front surface of the lens. In such a glass lens, the frontal optical surface is usually of continuous curvature from the host glass of the major blank across the surface of the added glass (fused segment) of different refractive index. On casual inspection such a glass lens appears to be made from a single piece of glass.

Prism correction in the reading areas (additions) of glass lenses, utilizing the technique of different indices of refraction, is limited by the extra thickness created by the necessary net refractive index ratio which can be achieved between compatible glasses. With glass, for every prism diopter of effect desired in the reading addition, it is necessary to physically incorporate in the overall lens from 3 to 8 prism diopters, depending upon the ratio of the indices of refraction of the two different glasses; this significantly increases the thickness of the overall finished glass lens. This means that a reading segment in a prism-corrected glass lens is very thick. Glass is very heavy per unit volume when compared to the resins used in resin ophthalmic lenses. Corrective lenses for aphakic patients are inherently thick centrally and thus are heavy. Resin lenses are preferred for aphakic patients because they are much lighter than comparable glass lenses. Heretofore, however, prism-compensated resin lenses have not been provided for aphakics or otherwise, although a need for such resin lenses has existed for some time. Prism-compensated resin lenses have not heretofore been provided because, until now, it has not been known how to manufacture such lenses.

The patent literature contains descriptions of glass lenses which have only apparent relevance to prism-compensated resin lenses or to resin lenses wherein desired prismatic optical effects are provided. On careful analysis, however, it is seen that these prior descriptions do not meaningfully assist in providing a solution to the need identified above. For example, U.S. Pat. No. 815,648 issued to Slagle in 1906 accurately describes one of the problems to which lenses according to the present invention is addressed, the problem of undesired prismatic effects when a lens designed for correcting a particular ametropic condition are used off the principal optical axis. Slagle addressed the problem by providing a composite glass lens in which the desired modification of the principal glass lens was made in the reading area of the principal lens by a separate glass lens element either adhered to one surface of the principal lens or disposed in an aperture in the principal glass lens. This solution may be possible in glass lenses, but it is not adaptable to resin lenses which must be cast in one casting step and which are inherently homogeneous.

U.S. Pat. No. 2,006,640, issued in 1935 to Hubbell purports to describe a homogeneous (noncomposite) glass lens having the optical characteristics of the resin lenses provided by the present invention. The difficulty with this disclosure, however, is that it describes a lens-making process which is not operative and which, as a practical matter, cannot be done. As a result, the descriptions in the Hubbell patent concerning lenses are a good description of one aspect of the problem addressed by the present invention, but these descriptions only state the problem and do not, in reality, include any workable descriptions of how such glass lenses actually can be made.

On the other hand, the literature pertinent to the manufacture of resin lenses, so far as I an aware, consistently describes molds for producing resin lenses in which reading additions of spheric optical effect are formed in major lens surfaces also of spheric optical effect. This aspect of the literature therefore has only apparent pertinence to the problems addressed by this invention, but do not actually advance solutions to those problems. U.S. Pat. No. 3,297,422, referred to more specifically below, is exemplary of this situation.

SUMMARY OF THE INVENTION

Resin ophthalmic lenses are made by a casting process in which a suitable resin, such as CR-39 allyl diglycol carbonate resin available from PPG Co. (formerly Pittsburgh Plate Glass Co.), is introduced in a liquid state into a suitable mold cavity and is cured in the cavity to a hardened state. A resin ophthalmic lens is inherently homogeneous in nature. For this reason it is not possible to use in resin lenses the technique of different indices of refraction used to provide prism-segmented glass lenses. It has been thought that resin lenses could not be prism-compensated even though, as noted, prism-compensated resin lenses are especially needed for aphakic patients.

This invention provides novel resin lenses and a workable method of manufacture of the molds by which such lenses can be cast. This invention thereby enables the manufacture of a novel resin lens which has, for example, a prism-compensated segment. This invention thus fills a need which has existed for some time in that portion of the optical industry concerned with resin ophthalmic lenses and other resin lenses. The utility of this invention is particularly significant when one notes that, in addition to being lighter than a glass lens, a resin lens according to this invention can be thinner than a comparable glass lens. The wall thickness of a prism-compensated segmented glass lens at the base edge of the reading segment must be 3 to 8 times as great as the base thickness of the prism reading segment of an all-resin lens provided by this invention.

The aspect of the invention claimed herein pertains to cast resin ophthalmic lenses. Each of such lenses comprises a homogeneous body defined of cured optical casting resin. The body has a cast optically finished front surface composed of a major surface portion and a minor surface portion. The minor surface portion defines in the front surface, in a selected localized area thereof, a lens segment having a predetermined prismatic optical effect. The major surface portion is a porition of a surface of revolution having a first axis of symmetry and having an effective center of curvature located therealong. The minor surface portion is a portion of a surface of revolution having a second axis of symmetry. The first and second axes of symmetry intersect, if at all, at a location on the first axis other than at substantially the center of curvature of the major surface portion.

DESCRIPTION OF THE DRAWINGS

The above-mentioned and other features of this invention are more fully set forth in the following detailed description of the invention, which description is presented with reference to presently preferred embodiments of the new lenses, of the molds for casting the lenses, and of the process for making the molds, and in which drawings:

FIG. 1 is a simplified diagram of an eye fitted with a multi-focal lens according to the prior art; FIG. 1 is presented in support of an explanation of the optical problems caused by the limitations and deficiencies of the prior art which are overcome by this invention;

DESCRIPTION OF THE ILLUSTRATED EMBODIMENT

Figure 1:
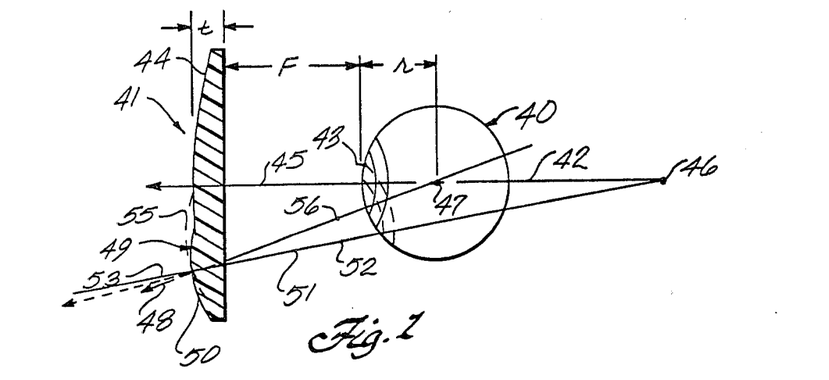

The present invention is described by contrast to the prior art and the problem to which this invention is addressed. Thus, FIG. 1 is a simplified diagram depicting a human eye 40 and resin lens 41 constructed in accord with what I believe is the nearly universal practice in the resin lens industry. In FIG. 1, line 42 is the line along which the eye looks or is aligned when looking straight ahead. For the purposes of explanation and example, assume that eye 40 is the eye of a person who requires a plus lens for proper vision and is a mature presbyope; this case is less extreme than that of an aphakic patient, and is used as an example to show that the present invention is not limited to improved treatment of aphakia as might have been suggested by the preceding remarks. (Presbyopia is the loss of the power of accommodation of the eye by virtue of a stiffening or loss of tone of the eye muscles which act to change the shape, and therefore the focal length, of the lens of the eye). Therefore, in order that eye 40 can be used to see objects at a distance, it requires the presence before it, along line 42, of lens 41 which focuses (converges) light from an infinitely distant source by an amount sufficient to enable eye lens 43 to focus the light rays passing through it on the retina at the rear of the eye. Lens 41 is a simplified representation of an appropriate lens. Lens 41 has a curved front principal surface 44 which is a portion (a segment) of a surface of revolution, typically a sphere. (A surface of revolution is the surface generated as a plane curve is rotated about a line; a sphere is the surface of revolution generated as a circle is rotated about a diameter of the circle. The line about which the curve is rotated is its axis of symmetry.) Surface 44 can be spherical or aspherical, but assume it is spherical. Surface 44 has an axis of symmetry 45 and a center of curvature 46 on axis 45. As is typical, the center of curvature of surface 44 is located substantially behind the eye's center of rotation 47. To assist the eye to see properly at a distance, axis 45 and the distance line of sight 42 are made coincident when the lens is properly fitted to the eye at the prescribed fitting distance F between the rear of the lens and the front of the eye. So long as eye 40 is looking ahead, lens 41 is effective to make the necessary optical correction for the eye.

However, when eye 40 is used in reading, it does not look straight ahead; it turns about its center of rotation 47, located in the eye, to look along line 48 which passes through the center of rotation. It is generally agreed that the usual reading distance for a person is 16 inches from the eyes at a location centered between the eyes. Light rays from a source 16 inches from the eye do not strike lens 41 in the same manner as rays from an infinite source, and so a different power lens is needed along line 48 than is needed along 42. Therefore, lens 41 is made as a bifocal lens and includes, superimposed on its front surface 44 at a location centered on the location where line 48 passes through the lens front surface, an additional lens 49 of power different from that of the remainder of lens 41. Lens 49 is a reading addition in lens 41. The front surface 50 of lens 49 is a surface of revolution (spheric or aspheric) and has an axis of symmetry 51 and a center of curvature 52 on such axis. Assume surface 50 is of spheric curvature.

At this point, the present practice in the resin lens making art begins to present a problem. Lens 41 is a resin lens. Resin lenses are cast from molds which have casting surfaces curved essentially as mirror images of the lens surfaces produced from them. Lens surface 44 is a spheric surface and so is the mold surface used to produce that lens surface. Lens surface 50 is also spheric and so is the surface of the mold from which it is cast. It is the present practice in the making of molds for resin lenses to define the spheric surface in the mold for a reading or other addition so that its axis is normal (i.e., perpendicular) to the principal mold surface (e.g., the mold surface from which lens surface 44 is cast). In other words, reading addition 49 of lens 41 is defined by use of a mold in which lens surface 50 is cast from a spheric recess in the mold surface from which surface 44 is cast, and the recess axis of symmetry lies along a line which is perpendicular to a plane tangent to the principal mold surface at the location corresponding to the center of the reading addition on lens surface 44. Thus, according to current universal practice of considerable longstanding, because of limitations in the making of molds for resin lenses, lens surface 50 has its axis of symmetry 51 positioned perpendicular a pla tangent to surface 44 at the point at which line 48 passes through surface 44. Surface 44 is spherical. All normals (perpendiculars) to a spheric surface pass through the center of curvature of the surface. Thus, due to limitations in current mold making techniques, the axis 51 of reading addition 49 passes through the center of curvature 46 of the lens principal surface 44. This presents a problem which can be overcome by the present invention.

The problem is that, in reading, eye 40 looks along line 48, not along line 51 which is the axis of reading addition 49. This is because the eye rotates about its center of rotation 47 which has a different location relative to lens 41 from the point 46 at which the first and second lens axes 45 and 51 intersect each other. Since eye 40 looks through reading addition 49 along a line off the axis of surface 44 and off the axis of the addition, prismatic deviation is encountered. This prismatic deviation is represented in FIG. 1 by broken line 53 which shows that a ray from the eye center of rotation 47 is bent from line 48 on encountering the rear surface of the lens and then again on encountering surface 50. The effect upon the eye is that the light striking the eye appears to come from a location different from the location on which the eye is trained. This prismatic deviation is the kind produced by a base-out prism. The stronger the correction of lens 41 for distance, or for distance and for reading, the greater this base-out prismatic deviation, and the greater the strain on the eye and the greater the likelihood that diplopia will be induced.

The condition truly desired in lens 41 for reading conditions is that the lens include a reading addition of the desired spheric power in which the axis of symmetry of the reading addition is aligned with the reading line of sight. This desired condition is represented in FIG. 1 by broken line 55 which is a spheric surface having a radius of curvature equal to that of surface 50, but having its center of curvature 56 located on the reading line of sight 48. The location of point 56 on line 48 results in the axis of surface 55 being aligned with line 48. This condition, however, requires that the mold surface used to cast lens surface 55 be formed out-of-normal to the mold surface used to cast lens surface 44; it is this out-of-normal relation which cannot be produced in current mold making procedures, but which can be produced by the present invention.

Thus, the problem described above as to lens 41 as represented in solid lines in FIG. 1 is due to the inability of present resin lens mold makers to do anything other than form a portion of a first sphere (or other surface of revolution) on a portion of a second sphere (or other surface of revolution) in such manner that the axes of symmetry of the two spherical portions intersect at substantially the center of curvature of the second sphere (or other surface of revolution) which point of intersection is invariably located, when the mold is reflected in a lens fitted to a patient, a substantial distance from the center of rotation of the patient's eye.

An aspheric surface of revolution has an axis of symmetry and, at least adjacent the point where the axis interests the surface, has a curvature approximating a sphere; the center of curvature of such approximating sphere is considered, at least for the purposes of this invention, as the effective center of curvature of the surface.

Figure 2:
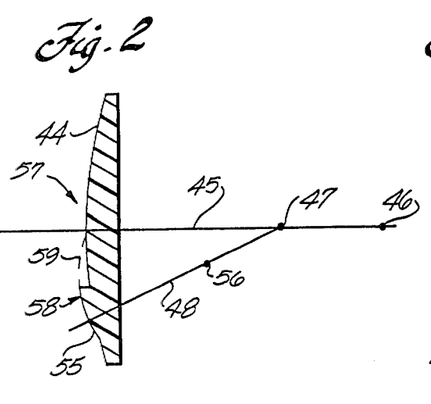
FIG. 2 is a simplification of the diagram of FIG. 1 and shows the lens actually desired for the eye represented in FIG. 1.

FIG. 2 is a simplification of FIG. 1 and shows a lens 57 which is actually desired for providing the proper optical correction for eye 40 and which is according to this invention. Lens 57 has a front surface having a major surface portion 44 symmetrical about axis 45 and has a center of curvature 46 on such axis. Lens 57 also has a reading addition 58 having a minor surface portion 55 symmetrical about axis 48 and a center of curvature 56 on such axis. Axes 45 and 48 intersect at point 47 on axis 45, i.e., at the center of rotation of eye 40. Because surface 55 is used only in reading, it is present in lens 57 only in the vicinity of the location where the reading line of sight 48 passes through the lens; it is cut away from the lens principal surface 44 a selected distance above line 48 so as not to interfere with distance viewing, as shown by broken line 59 in FIG. 2.

Figure 3:
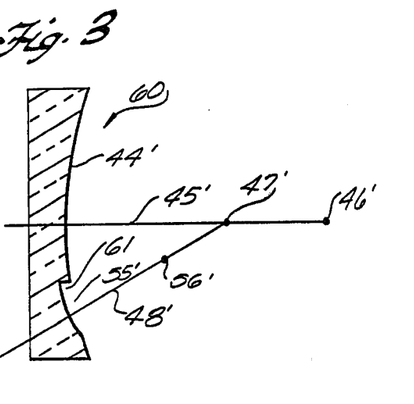
FIG. 3 is a cross-sectional elevation view of a mold according to this invention useful to cast the front surface of the lens represented in FIG. 2.

FIG. 3 is a cross-sectional elevation view of a glass mold 60 configured for the casting of lens 57 shown in FIG. 2. Since mold 60 is useful to define the front surfaces of lens 57, the detailed features of mold 60 are assigned reference numbers in FIG. 3 which are primed relative to the reference numbers appearing in FIG. 2. Thus, mold 60 has a principal casting surface 44' which is essentially the reverse of lens surface 44 and which has an axis of symmetry 45' and a center of curvature 46' on such axis. The mold also has a minor casting surface 55' defined by the bottom surface of a recess 61 in the principal casting surface. Surface 55' is a portion of a surface of revolution which is essentially the reverse of surface 55 and which has a center of curvature 56' located on an axis of symmetry 48' which intersects axis 45' at point 47'.

Figures 7, 9:
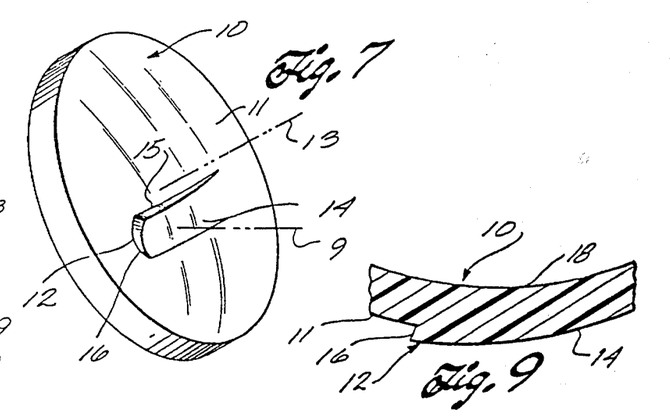
FIG. 7 is a perspective view of a semi-finished lens cast by use of the mold member shown in FIGS. 13 and 20.
FIG. 9 is an enlarged fragmentary cross-sectional view taken along line 9—9 in FIG. 8.
Figure 8:
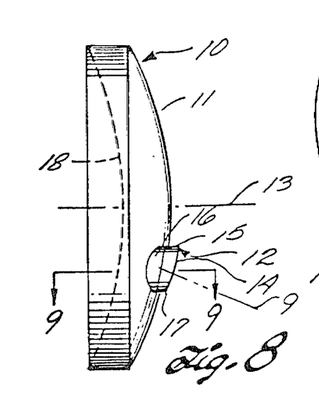
FIG. 8 is a side elevation view of the semi-finished lens shown in FIG. 7.

FIGS. 7, 8 and 9 show a semi-finished resin lens 10 according to this invention which is made of optical casting resin which preferably is CR-39 allyl diglycol carbonate resin available from PPG Co. The lens is cast, according to precedures well known in the art, by use of a mold member 20 which is according to this invention and which is made by the procedures described below with reference to FIGS. 10 through 20. The semi-finished lens 10 has a front face 11. A prismatic segment 12, i.e., a prismatic segment having a prismatic optical effect when the lens is finished to a desired prescription and fitted to a person requiring that optical prescription, projects from the lens front face 11 and occupies a desired position relative to an optical axis 13 of the lens. As cast, lens front surface 11 is an optically finished surface and has a desired curvature, either spherical or aspheric, symmetrical or essentially so about optical axis 13 over the entirety of the frontal area of lens 10 except for that portion of the frontal area of the lens which is occupied by prismatic segment 12. As shown best in FIG. 8, the curvature of the front face of lens 10 is a plus curvature.

Prismatic segment 12 has a front surface 14 which is an optically finished surface defined in the course of casting the lens. Surface 14 is a portion of a spheric or aspheric surface of revolution symmetrical about an optical axis 9. Axis 9, if it intersects axis 13, intersects axis 13 at a location thereon which is other than at substantially the center of curvature of surface 11. As shown in FIG. 9, that portion of lens 10 which projects from surface 11 to define prismatic segment 12 is homogeneous with the remaining material of the lens and has the same optical, physical and chemical properties as the body of the lens.

Lens 10 is typical of the lenses which can be provided by this invention in that the front surface 14 of prismatic segment 12 is merged into the principal optical surface 11 of the lens 10 in an essentially continuous manner; see also FIG. 9. Prismatic segment front surface 14 is separated from lens principal surface 11 on three sides by ledge surfaces 15, 16 and 17 which are not relied on as optical surfaces in lens 10. The prismatic segment 12 is surrounded on all sides by lens surface 11.

Figure 21:
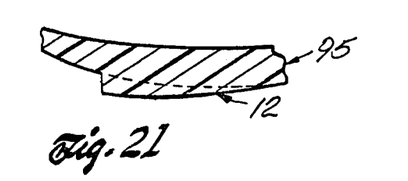
FIG. 21 is a fragmentary cross-section view, similar to that of FIG. 9, showing a finished lens formed from the semi-finished lens shown in FIGS. 7, 8 and 9.

It was mentioned above that lens 10 is a semi-finished lens. The term "lens" is used broadly herein to refer to both semi-finished and finished lenses. A semi-finished lens is a resin lens as cast in which the front surface is an optical surface, the rear surface 18 (see FIG. 8) requiring further processing in order that the semi-finished lens may become a finished lens suitable for filling a particular optical prescription. The rear surface of a semi-finished lens may be of optical quality but is not used as an optical surface. A finished lens, on the other hand, is a lens in which the front and back surfaces are both of optical quality and are correlated in curvature to define a particular optical prescription. A finished lens may be cast essentially in a finished state, or it may be defined by optically grinding and polishing the rear surface of a cast semi-finished lens; the latter instance is more common, especially with multi-focal lenses. A finished lens is shown in FIG. 21.

Figure 11:
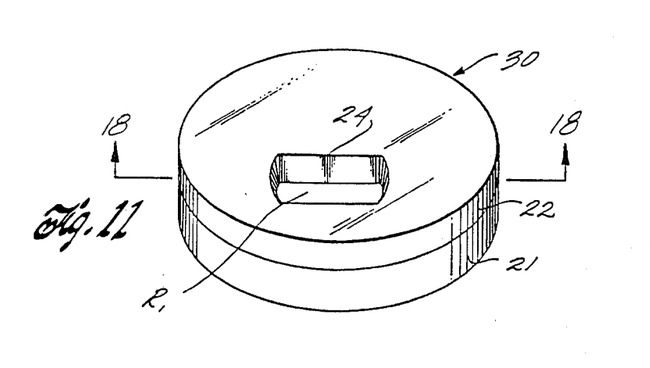
FIG. 11 is a perspective view showing the resulting blank following fusion of the first and second blanks.
Figure 12:
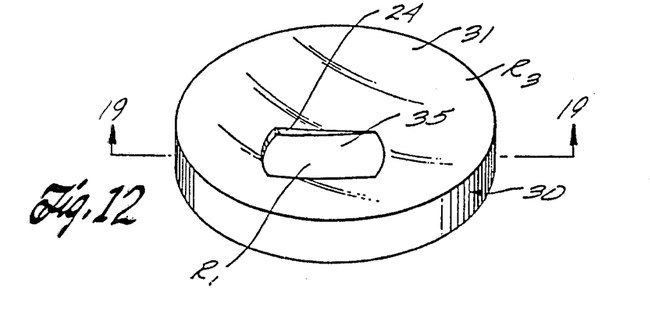
FIG. 12 is a perspective view of the resulting blank after a further processing step.
Figure 13:
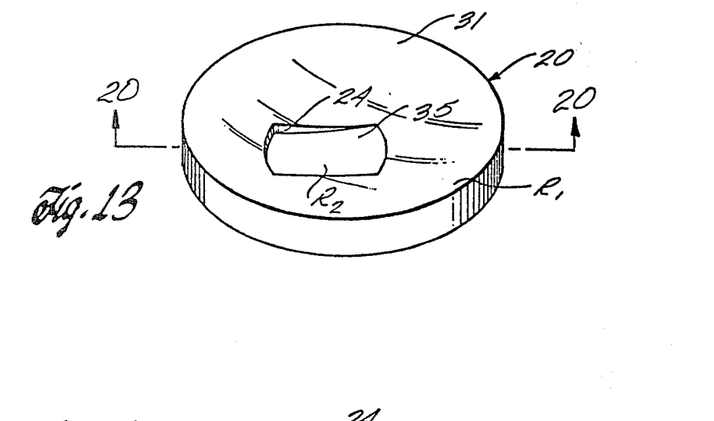
FIG. 13 is a perspective view of a finished mold.
Figure 14:
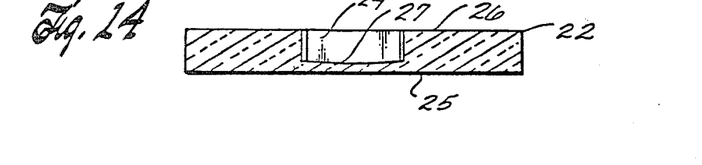
FIG. 14 is a cross-sectional elevation view of a second blank as initially provided.
Figure 15:
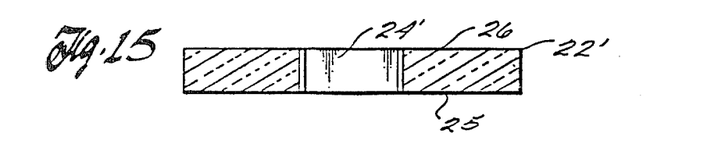
FIG. 15 is a perspective view of an alternate second blank as initially provided.
Figures 16, 17:
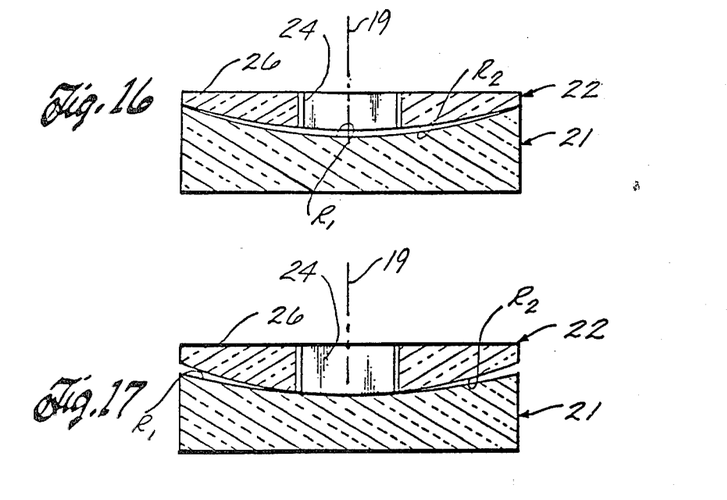
FIG. 16 is a cross-sectional view of the first and second blanks registered with each other according to one aspect of the invention.
FIG. 17 is a cross-sectional view of the registered blanks according to an aspect of this invention alternative to that shown in FIG. 16.
Figure 18:
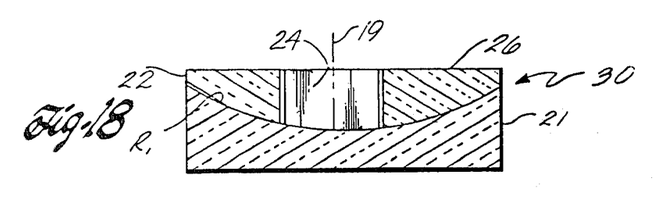
FIG. 18 is a cross-sectional view taken along line 18—18 in FIG. 11.
Figure 19:
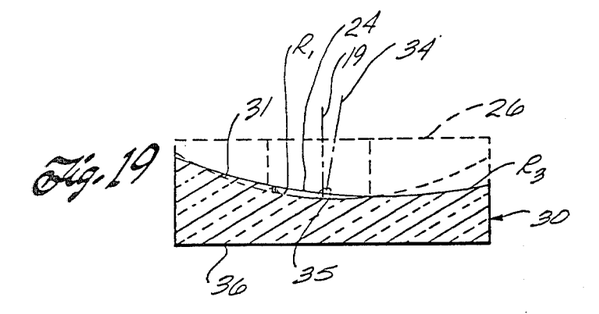
FIG. 19 is a cross-sectional view taken along line 19—19 in FIG. 12.
Figure 20:
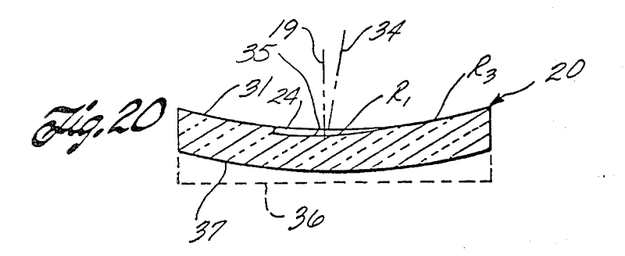
FIG. 20 is a cross-sectional view taken along line 20—20 in FIG. 13.

The molds which are used in casting the front faces of lenses 10 and 60 are manufactured according to the sequence of operations illustrated in FIGS. 10 through 20 which pertain more closely to the mold for lens 10 than to mold 60. FIG. 15 illustrates an arrangement alternative to that shown in FIG. 14, and FIG. 17 shows an arrangement alternative to that ilustrated in FIG. 16. A finished mold 20, corresponding to lens 10, is shown in FIGS. 13 and 20. In the description pertinent to FIGS. 10-20, it is assumed that the mold will be used to produce lens 10 and that surfaces 11 and 14 of that lens have spherical curvature; this invention comprehends the presence of either spheric or aspheric surfaces on the lens and on the mold for producing the lens.

Figure 10:
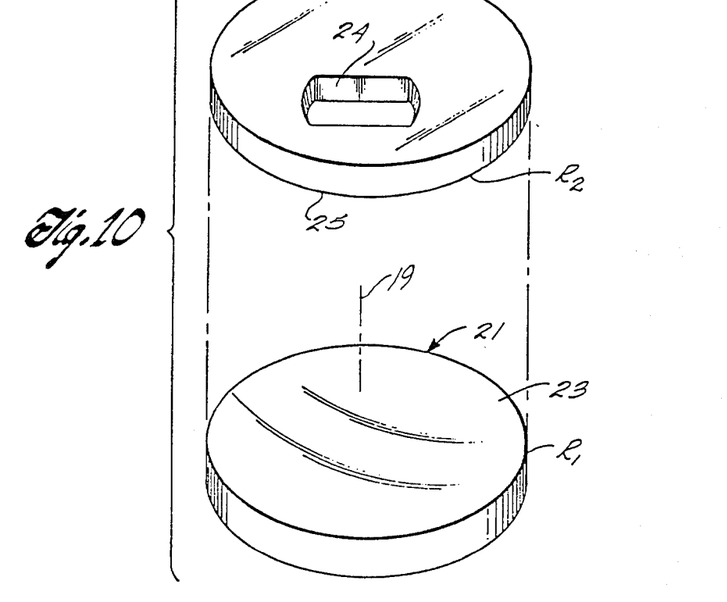
FIG. 10 is an exploded perspective view of first and second mold blanks for the mold in an initial stage of the mold making process.

Mold 20 is comprised of a pair of blanks which, as shown in FIG. 10, preferably are a circular major blank 21 and a circular blank 22 of equal diameter. It is preferred that the blanks be made of glass, and that blank 22 be a pressed glass blank. The glasses of blanks 21 and 22 are of sufficiently similar composition and physical properties that they may be adhered together by fusing according to conventional procedures. While it is not necessary that the glasses of the major and pressed blanks have the same indices of refraction, this identity is preferred to facilitate inspection of the finished mold. Major blank 21 has a front surface 23 which is ground and polished to have superior optical properties. Surface 23, as formed by an initial step in the mold making process, has a curvature represented in FIG. 10 as curvature $R_1$ which is related to the curvature of the front face 14 of prismatic segment 12 in lens 10, because a portion of curvature $R_1$ is relied upon to define lens surface 14. Thus, curvature $R_1$ is essentially the reverse of the curvature of lens surface 14. As ground and polished on blank 21, surface 23 has an axis of symmetry 19; see FIGS. 10 and 16-20.

Pressed glass blank 22 has formed at least partially therethrough a recess 24 which has a perimetral shape which is at least partially congruent to the perimetral shape of prismatic segment 12 on lens 10. That is, recess 24 has a perimetral shape which is congruent to the perimetral shape of the prismatic segment as defined at least by edge surfaces 15, 16 and 17. Recess 24 is formed in pressed blank 22 at the position on the pressed blank which corresponds to the position of prismatic segment 12 in lens 10 relative to optical axis 13. The moldmaking process includes forming a rear surface 25 of pressed blank 22 to have a curvature $R_2$ which is essentially the reverse of curvature $R_1$. In defining the surface having curvature $R_2$, it is not necessary that the surface have an optical quality; no portion of this surface is relied upon in mold 20 to form an optical surface in the lens cast by use of the mold.

FIGS. 14 and 15 are cross-sectional elevation views of alternative pressed glass blanks 22 and 22', either of which may be used to advantage in the manufacture of mold 20. FIGS. 14 and 15 show the pressed glass blanks, as initially provided, prior to the formation of rear surface 25 thereof to curvature $R_2$. In pressed glass blank 22, recess 24 extends only partially through the blank from the blank front surface 26. In pressed glass blank 22', however, recess 24' extends entirely through the blank. In those instances where the pressed glass blank is of the type shown in FIG. 14, the process of shaping the rear surface of the blank to curvature $R_2$ includes the removal of all of the glass from the blank which lies between the recess bottom surface 27 and the initial rear surface of the blank. That is, if the pressed glass blank, as initially provided, has the recess defined only partially therethrough, upon completion of the shaping of rear surface 25 to curvature $R_2$ the recess extends all the way through the blank.

It was mentioned above that curvatures $R_1$ and $R_2$ on the front 23 and rear 25 surfaces of the major and pressed glass blanks 21 and 22 are essentially the reverse of each other. While these curvatures may be identically the reverse of each other, it is preferred that they be slightly different in curvature. Curvature $R_2$ may have a greater radius than curvature $R_1$, as shown in FIG. 16, or it may have a smaller radius than the radius of curvature $R_1$, as shown in FIG. 17. In any event, it is preferred that the curvatures $R_1$ and $R_2$ be only slightly different from each other to provide essentially line contact between the major and pressed glass blanks when they are registered with each other, as shown in FIGS. 11, 16 and 17 with their formed surfaces in opposition to each other. This line contact assures that no air pockets will occur in resulting blank 30 which is obtained by adherence of the major and pressed glass blanks together, preferably by a thermal fusion process. Where, as preferred, a thermal fusion process is used to adhere pressed glass blank 22 to major blank 21, the fusion process is performed under such conditions that the curvature $R_1$ of optically finished surface 23 is not altered. Deformation of the fused glass blank to conform to the curvature $R_1$ of major blank surface 23 is of no consequence because, to this point in the mold-making procedure, no portion of the pressed glass blank has been processed to an optical state which will be relied upon to form an optically finished surface in the lenses to be cast from the mold.

Adherence of blanks 21 and 22 to each other produces a resulting blank 30 which is illustrated in FIGS. 11 and 18. The upper surface 26 of the resulting blank is then formed to a curvature $R_3$ (see FIGS. 12 and 19) to produce a new top surface 31 of the resulting blank. Curvature $R_3$ is substantially the reverse of the curvature which is desired in surface 11 of lens 10. The surface 31 therefore is formed with an optical quality, since this surface is relied upon in the lens casting process to define lens surface 11. As ground and polished on the resulting blank, surface 31 has an axis of symmetry 34 which intersects axis 19, if at all, at a location on axis 34 other than at substantially the center of curvature of surface 31.

It will be observed from an examination of FIGS. 12 and 20 that surface 31 is formed to curvature $R_3$ in such a manner that not all traces of recess 24 are removed from the resulting blank. Accordingly, recess 24 has a remnant thereof in the resulting blank upon completion of the formation of surface 31, which remnant has a configuration essentially the reverse of prismatic segment 12 of lens 10.

As shown in FIG. 19, surface $R_1$ as defined according to the procedure described above has associated with it axis 19 which corresponds to axis 9 of lens 10; as noted above, the curvature $R_1$ may be either aspheric or spherical; it has been assumed to be spherical. Curvature $R_3$ has axis 34 associated with it, which axis corresponds to axis 13 of lens 10. Similarly, curvature $R_3$ may be aspheric or spherical; it has been assumed to be spherical. As shown in FIG. 19, however, axes 19 and 34 are not collinear, and if they intersect, they intersect along axis 34 at a point other than at the center of curvature of surface 31. As a result, the volume defined within resulting blank 30 upon formation of surface 31, relative to an imaginary extension of surface 31 across the top of the recess, is geometrically that of a wedge which is wrapped along the imaginary continuation of surface 31 across the recess; this is shown in FIG. 21 in the context of a finished lens formed from the semi-finished lens 10 cast from mold 20.

Preferably, surface 31 is defined in the resulting blank so that the remaining portion of recess 24 has three distinct sides corresponding to edge surfaces 15, 16 and 17 of lens prismatic segment 12 and so that the bottom surface 35 of the recess is substantially faired or blended into optically finished surface 31. Recess 24 is defined in a base-out relation to axis 34 in that the recess wall corresponding to lens segment surface 16 is located away from axis 34; this results in a base-in prism being defined by segment 12 in the reading area of a lens cast from mold 20.

The resulting blank 30, in the form shown in FIG. 19, may be used directly as a mold for casting the front surface features of lens 10. It is preferred, however, that the resulting blank be further formed on its rear surface 36 (see FIG. 19) so that mold 20 is of substantially uniform thickness across its diameter but for the presence of recess 24 therein. If the resulting blank is so processed, it acquires a new rear surface 37 which differs from its original rear surface 36 in the manner shown in FIG. 20.

The article shown in FIG. 20 is the finished mold 20 for use in casting the front surface features of lens 10. Mold 20 is mated with a suitable circumferential gasket to which is also mated a second mold member, in a manner well known in the art, to provide a suitable mold assembly. The mold assembly defines a mold cavity into which liquid casting resin is introduced in a manner also well known in the art. The resin-filled mold assembly is then subjected to a curing operation which is generally well known in the art, although specific details of the curing process are regarded by many manufacturers of resin lenses as proprietary to them. Upon curing of the resin within the mold assembly according to the particular curing cycle desired, the mold assembly is taken apart to obtain semi-finished lens 10 shown in FIGS. 7, 8 and 9.

Comparing FIGS. 7 and 20, it will be apparent that axis 34 associated with curvature $R_3$, i.e., with optically finished surface 31 of mold 20, corresponds to optical axis 13 of lens 10, and that axis 19 associated with curvature $R_1$ corresponds to optical axis 9 of the lens.

Prismatic segment 12 of lens 10 may be located in any desired position and in any desired orientation on the front face 11 of the lens. Most commonly, the prismatic segment is located in such a position relative to lens optical axis 13 as to be in the line of sight of a user of the lens, when finished and installed in suitable spectacle frames, when the user is reading; this case is shown in FIG. 21 which shows a finished lens 95 as made from semi-finished lens 10. Lens 95 has an optically finished rear surface 96 which has a curvature selected, in combination with the curvatures of the major portion 11 and the minor portion 14 of the lens front surface, to define a desired optical prescription for a specified user of the lens when the lens is properly fitted to the user. In those instances where the finished lens is used by an aphakic patient, the geometry of the prismatic segment relative to the curvature of surface 11 may usefully be defined so as to fully compensate for the prismatic effects associated with that portion of the finished lens which is subtended by the prismatic segment 12, i.e., the portion of the lens through which the line of sight would pass if the segment were not present in the lens as represented in FIG. 21 by the portion of lens 95 between surface 14 and the broken line in FIG. 21. Where this relationship exists, as in lens 95, the lens is fully prism-corrected in the reading addition of the lens. That is, the optical wedge effect of segment 12 is either the same or substantially the same as, but opposite in nature to the wedge effect of that portion of lens 95 between surfaces 11 and 96 which is covered by the segment, so that the segment offsets or fully compensates for the prismatic optical effect of the lens without the segment. This prism correction is made possible because the axis of the segment is not constrained by the mold making process to pass through the center of curvature of the principal casting surface. It is this freedom from constraint on the relation between the mold surface axes which makes it possible to now make prism-corrected resin lenses with which aphakics and the like may read comfortably. It also makes is possible to make lens 57 which is free of the effects of prism deviation. It will be apparent, however, that the prismatic segment of a lens according to this invention may have other geometrical relationships relative to the basic lens subtended by the prismatic segment. For example, this invention comprehends resin lenses having radical prismatic properties useful in orthoptic treatment. It will therefore be appreciated that the prismatic segment of an improved lens may be in other areas of the lens than that corresponding to the reading additions of a multifocal lens and may occupy greater or smaller portions of the frontal surface of the lens; in this regard, see FIGS. 22, 23 and 24.

In view of the foregoing description, it is apparent that surface 26, rather than surface 25, of blank 22 could be ground and polished to curvature $R_2$ if desired. If this variation in the procedure described above is practiced, then a small vent hole should be drilled or otherwise formed through the blank from recess bottom surface 27 to surface 25 to allow air to pass from and to the recess as the blank is first heated and then cooled in the course of being fused to blank 21. Processing and fusing of blank 22 in an upside-down manner protects the optically finished surface 23 of blank 21 during fusion.

Thus, in general terms, curvature $R_2$ is formed in one face of blank 22 in such manner that recess 24 is fully open to the surface having curvature $R_2$ upon completion of formation of that surface; the second optically finished surface of curvature $R_3$ is formed in that surface of the resulting blank 30 which in blank 22 was opposite to the surface formed to curvature $R_2$.

Referring again to FIG. 1, dimension F is the fitting distance of lens 41 from eye 40. The fitting distance is measured from the rear (posterior) face of the lens to the front of natural lens 43 when the eye is looking straight ahead. The fitting distance usually falls in the range of from 8 to 14 mm., and typically is about 10 mm. Dimension t is the thickness of the lens along the distance (straight ahead) line of sight 42, and in resin lenses ranges from about 2 mm. for a highly myopic patient who requires a highly negative net lens curvature to about 14 mm. for an aphakic patient. Dimension r is the distance from the front of natural lens 43 to the center of rotation 47 of the eye. For practical purposes, the center of rotation is considered to be a point 13 mm. behind the lens on the line of sight when looking straight ahead; see *Clinical Refraction,* by Irvin N. Borish, Professional Press, Inc., 101 E. Ontario St. Chicago, Ill. 60611. The actual center of rotation of the eye is fixed relative to the head (and to lenses mounted in spectacles supported on the head) but is, relative to the eye, a variable location on a caustic curve as the eye turns. These dimensions enable a quantitative property to be derived for a family of lenses, according to this invention, in which the axes of the lens principal and minor surfaces intersect at a location on the principal surface axis of symmetry which corresponds to the centers of rotation of the eyes to which the lenses are fitted. Where the lens surface axes intersect, they do so at a location on the principal surface axis which is in the range of from about 23 mm. to about 41 mm. from the principal lens surface. As shown in FIG. 1 and in the preceding description, current mold making practice causes these axes to intersect at point 46 which, except in rare cases, is outside the 23 to 41 mm. range.

Figure 4:
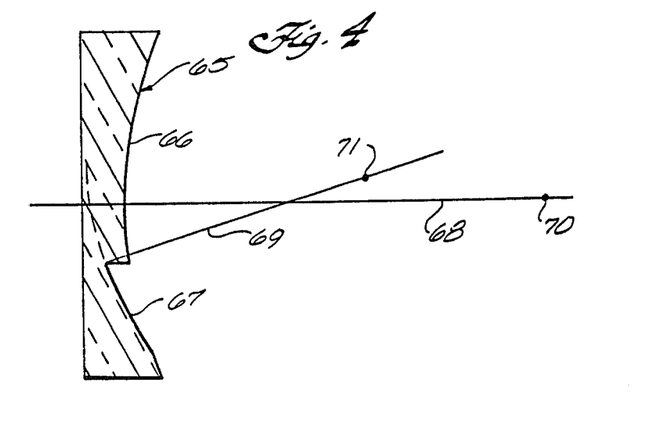
FIG. 4 is a cross-sectional elevation view of another mold according to this invention useful to produce a novel resin lens different from the lens represented in FIG. 2.
Figure 5:
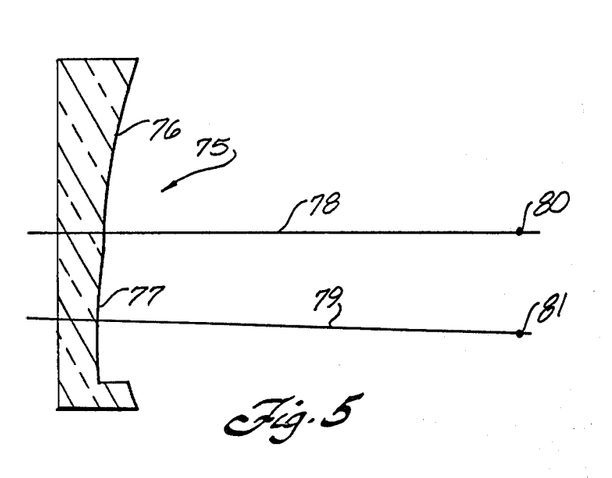
FIG. 5 is a cross-sectional elevation view of another mold useful to produce another novel lens different from that represented in FIG. 2.
Figure 6:
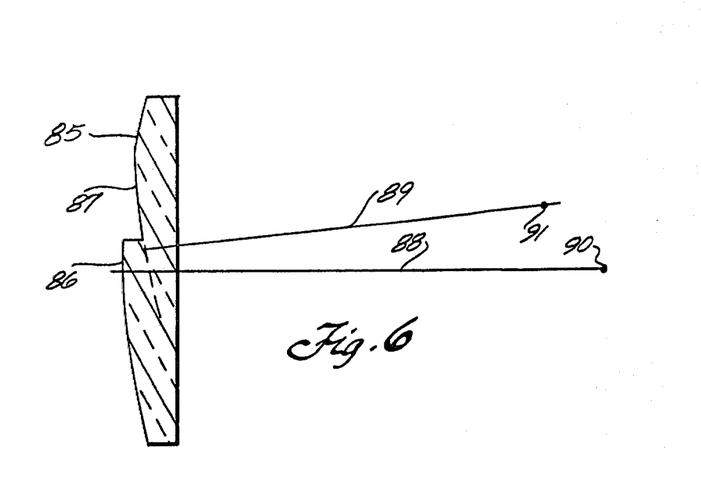
FIG. 6 is a cross-sectional elevation view of a further mold useful to produce a further novel lens different from that represented in FIG. 2.

FIGS. 4, 5 and 6 show other novel molds which are useful to make novel resin lenses the pertinent features of which are apparent from the molds. Mold 65 (see FIG. 4) is generally similar to mold 60 (FIG. 3) and has principal and minor casting surfaces 66 and 67, respectively, which are surfaces of revolution having axes of symmetry 68 and 69 and centers of curvature 70 and 71, respectively. Axes 69 and 70 do not intersect at all, but are skew to each other. Mold 75 (see FIG. 5) has principal and minor surface-of-revolution casting surfaces 76 and 77 with axes of symmetry 78 and 79 and centers of curvature 80 and 81, respectively. Axes 78 and 79 diverge from each other proceeding away from the mold surfaces and do not intersect on the casting side of the lens, if at all. The radii of curvature of surface 76 and 77 may be identical or similar. Mold 85 (FIG. 6) has convex principal and minor surface-of-revolution casting surfaces 86 and 87 with axes of symmetry 88 and 89 and centers of curvature 90 and 91, respectively. The centers of curvature are on the side of the mold opposite from the casting surfaces. FIG. 6 shows that the axes of symmetry of one or the other or both of the casting surfaces may not pass through the portion of the corresponding surface as defined in the finished mold; this is shown by the relation of axis 89 to the portion of surface 87 which exists in the final mold. From a comparison of FIG. 6 with FIGS. 3-5, for example, it will be appreciated that one of the casting surfaces can be concave and the other convex, if desired.

Figure 22:
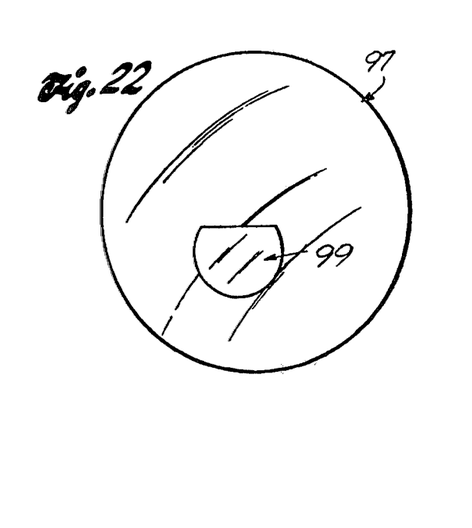
FIG. 22 is a front view of another semi-finished lens.
Figure 23:
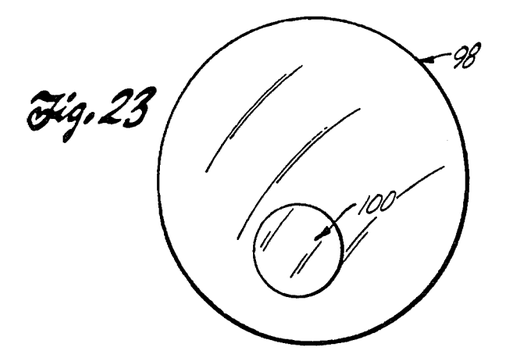
FIG. 23 is a front view of still another semi-finished lens.
Figure 24:
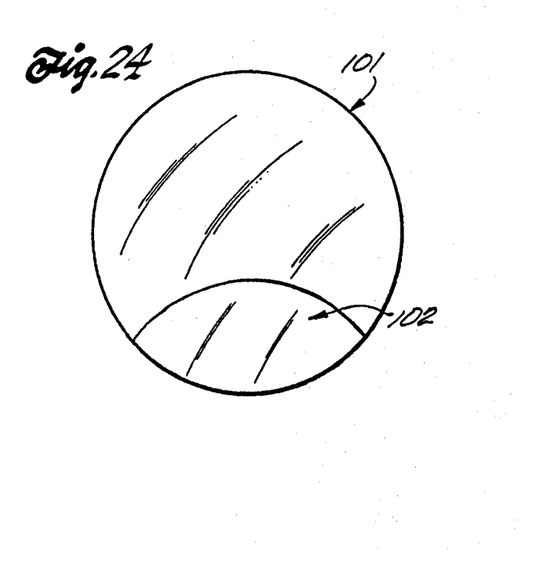
FIG. 24 is a front view of yet another semi-finished lens.

FIGS. 22 and 23 are front views of additional semi-finished lenses 97 and 98 having differently shaped prismatic segments 99 and 100, respectively, defined in their front surfaces in reading areas of the lens. Segments 99 and 100 are located wholly inwardly from the peripheries of lenses 97 and 98. FIG. 24 is a front view of another semi-finished lens 101 which has on its front face a prismatic segment 102 which extends over a larger area of the lens front face to the periphery of the lens. The molds for casting lenses 97, 98 and 101 preferably are made by the procedure described generally above.

Workers skilled in the art to which this invention pertains will recognize that the mold making procedure has been described above with reference to the manufacture of a mold for a lens analagous to a bifocal lens. Trifocal lenses are common today, in both glass and resin. Workers in the art will readily appreciate that the mold making procedures described above may be used to advantage to prepare molds for the casting of trifocal lenses in which either or both of the reading and intermediate additions are defined by prismatic segments, and that the prismatic segments may or may not be defined to compensate for the prism effects of those portions of the lenses subtended by the prismatic segments. That is, the mold element illustrated in FIG. 19 may be used as an intermediate stage in the manufacture of a trifocal resin lens mold having two prismatically contoured recesses therein, the recesses being at least partially coextensive with each other; such a mold will be seen to be obtainable by repeating the procedure illustrated in FIGS. 10, 11, 12, 14, or 15, 16, or 17, 18, 19 and 20, using an additional pressed glass blank having a recess therein of different size and/or shape as compared to recess 24 in pressed glass blank 22.

All of the lenses and molds described above are free of the limitation imposed by conventional mold making techniques upon segmented glass molds for resin lens. That limitation was that the segment surface of the mold, i.e., the mold minor casting surface, was a first surface of revolution ground into a second surface of revolution in such manner that the axes of symmetry of the surfaces intersected each other at a point on the axis for the second surface which was at substantially the center of curvature of the second surface. This invention enables the fabrication of segmented molds in which the axes of symmetry of the principal and minor surface-of-revolution casting surfaces may not intersect at all, or which, if intersecting, intersect at a location on the second surface axis other than at substantially the second surface center of curvature. Thus, this invention enables the manufacture of resin lenses which heretofore could not be made, and such lenses are a part of the present overall invention. The procedures described above can be used to define molds identical to those previously produced, although it would appear there is little practical motive to do so in view of the effectiveness of current procedures. The important aspect is that this invention makes it possible to produce molds and lenses which cannot be produced by procedures previously known.

In the preceding description, the lens features cast by the recessed minor casting surfaces of the new molds have been referred to as "prismatic segments." These segments have been so called because their optical effects, per se, are prismatic in nature (wholly, or partially with spherical effects) as distinguished from the optical effects which would be produced by the adjacent portion of the lenses were these segments not present on the lenses. The resultant optical effects of the overall lenses (i.e., the combination of the prism segment and the adjacent portion of the principal lens), when properly fitted to appropriate patients, may be purely prismatic, or purely spherical (as in the case of lens 57, e.g., where prism segment 58 has both a spherical effect and a prism effect which compensates for the prism effect of the adjacent portion of the principal lens), or a desired combination of prismatic and spherical and/or other optical effects.

Workers skilled in the art to which this invention pertains will readily appreciate that the present invention has been described above with reference to presently preferred procedures and structural arrangements for the purposes of example in furtherance of an explanation of the principles of this invention. The foregoing description is not exhaustive of all embodiments and forms which this invention may take. Accordingly, modifications, alterations and variations in the arrangements and procedures described above may be practiced without departing from the scope of this invention while relying on and taking advantage of the advances which this invention provides. Accordingly, the foregoing description should not be considered as limiting the scope of this invention.

What is claimed is:

1. A cast resin ophthalmic lens comprising a homogeneous body defined of cured optical casting resin and having a cast optically finished front surface composed of a major surface portion and a minor surface portion, the minor surface portion defining in the front surface in a selected localized area thereof a lens segment having a predetermined prismatic optical effect, the major surface portion being a portion of an aspheric surface of revolution having a first axis of symmetry and having an effective center of curvature located therealong, the minor surface portion being a portion of a surface of revolution having a second axis of symmetry, the first and second axes of symmetry intersecting, if at all, at a location on the first axis other than at substantially the center of curvature of the major surface portion, said axes having substantial angularity therebetween if they intersect.

2. A cast resin ophthalmic lens comprising a homogeneous body defined of cured optical casting resin and having a cast optically finished front surface composed of a major surface portion and a minor surface portion, the minor surface portion defining in the front surface in a selected localized area thereof a lens segment having a predetermined prismatic optical effect, the major surface portion being a portion of an aspheric surface of revolution having a first axis of symmetry and having an effective center of curvature located therealong, the first axis being the principal optical axis of the lens, the minor surface portion being a portion of a surface of revolution having a second axis of symmetry, the first and second axes of symmetry intersecting, if at all, at a location on the first axis other than at substantially the center of curvature of the major surface portion, said axes having substantial angularity therebetween if they intersect, the segment being defined in a reading area of the lens relative to the optical axis, and the geometry and orientation of the segment are so correlated to the aspheric curvature and the position of the segment relative to the optical axis that the optical effect of the segment substantially compensates for that prism effect which would be produced by the lens were the segment not present.

3. A cast resin ophthalmic lens comprising a homogeneous body defined of cured optical casting resin and having a cast optically finished front surface composed of a major surface portion and a minor surface portion, the minor surface portion defining in the front surface in a selected localized area thereof a lens segment having a predetermined prismatic optical effect, the major surface portion being a portion of a surface of revolution having a first axis of symmetry and having an effective center of curvature located therealong, the minor surface portion being a portion of a surface of revolution having a second axis of symmetry, the first and second axes of symmetry intersecting, if at all, at a location on the first axis other than at substantially the center of curvature of the major surface portion, said axes having substantial angularity therebetween if they intersect and intersecting, if at all, on the side of the lens on which said front surface is defined.

4. A cast resin ophthalmic lens comprising a homogeneous body defined of cured optical casting resin and having a cast optically finished front surface composed of a major surface portion and a minor surface portion, the minor surface portion defining in the front surface in a selected localized area thereof a lens segment having a predetermined prismatic optical effect, the major surface portion being a portion of a surface of revolution having a first axis of symmetry and having an effective center of curvature located therealong, the minor surface portion being a portion of a surface of revolution having a second axis of symmetry, the first and second axes of symmetry intersecting, if at all, at a location on the first axis other than at substantially the center of curvature of the major surface portion, said axes having substantial angularity therebetween if they intersect, said lens being cast in a mold made by forming in one face of a first blank an optically finished first surface having a curvature essentially identical to that of the minor surface portion of the lens front surface, providing a second blank of characteristics sufficiently compatible with those of the first blank that the first and second blanks may be stably adhered together and which has formed at least partially therethrough a recess having a perimetral shape congruent to the perimetral shape of the segment, forming in one side of the second blank a second surface which is essentially reversely curved to that of the first blank finished surface in such manner that the recess is fully open to the second blank second surface upon completion of formation of said second surface, adhering the registered blanks together with the first and second surfaces in abutment to define a resulting blank, and forming in that face of the resulting blank which was opposite from the second surface an optically finished third surface having a curvature essentially identical to the curvature of the major surface portion of the lens front surface without eliminating the recess entirely from the resulting blank.

* * * * *